(12) United States Patent
Gosse

(10) Patent No.: US 8,687,333 B2
(45) Date of Patent: Apr. 1, 2014

(54) OVERCURRENT LIMITING FOR HIGH SIDE SOLENOID SWITCH CONTROLS

(75) Inventor: James A. Gosse, Storrs, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 323 days.

(21) Appl. No.: 13/161,567

(22) Filed: Jun. 16, 2011

(65) Prior Publication Data

US 2012/0320478 A1    Dec. 20, 2012

(51) Int. Cl.
*H02H 3/00*    (2006.01)

(52) U.S. Cl.
USPC ............................................. 361/87

(58) Field of Classification Search
USPC ............................................. 361/87
See application file for complete search history.

(56) References Cited

U.S. PATENT DOCUMENTS

| | | |
|---|---|---|
| 4,529,165 A | 7/1985 | Lehrach |
| 4,725,801 A | 2/1988 | Snyder |
| 5,347,419 A | 9/1994 | Caron et al. |
| 5,621,603 A | 4/1997 | Adamec et al. |
| 5,815,362 A * | 9/1998 | Kahr et al. ............... 361/153 |
| 5,915,667 A | 6/1999 | Kim et al. |
| 6,839,216 B2 | 1/2005 | Hagiwara |
| 6,850,402 B2 | 2/2005 | Ahrendt |
| 7,248,453 B2 | 7/2007 | Ahrendt |
| 7,453,678 B2 | 11/2008 | Beneditz et al. |
| 7,845,823 B2 | 12/2010 | Mueller et al. |

OTHER PUBLICATIONS

Horowitz et al., The Art of Electronics, 2006, The Press Syndicate of the University of Cambridge, Second Edition, 229-230.*

* cited by examiner

*Primary Examiner* — Rexford Barnie
*Assistant Examiner* — Tien Mai
(74) *Attorney, Agent, or Firm* — Carlson, Gaskey & Olds P.C.

(57) ABSTRACT

An overcurrent protection circuit for a high side solenoid switch includes a primary bias circuit and a secondary bias circuit. The secondary bias circuit is operable to alter a source to gate bias voltage of the high side solenoid switch during an overcurrent.

14 Claims, 2 Drawing Sheets

OVERCURRENT LIMITING FOR HIGH SIDE SOLENOID SWITCH CONTROLS

GOVERNMENT RIGHTS

This invention was made with government support under Contract No. F33657-99-D-2051 awarded by the United States Air Force. The Government has certain rights in this invention.

BACKGROUND

The present disclosure is directed to high side solenoid switch controls, and particularly to an overcurrent limiting circuit for the same.

Solenoids for use in engine systems are typically controlled using a high side solenoid switch. The high side solenoid switch is a transistor and is controlled using both software controls and hardware controls. Operation of the solenoid is controlled by the current passed through the high side solenoid switch. In order to protect the solenoid control hardware from overcurrents, a fault sensor is included within the hardware controls of the high side solenoid switch.

Typical fault sensors determine that a fault is present when a predefined overcurrent threshold is exceeded for greater than a set period of time. Determining that a fault condition is present only after an overcurrent has existed for greater than the set period of time is referred to as validating the overcurrent condition. Validating an overcurrent condition prevents a power source from being disconnected from the solenoid in the case of isolated transient occurrences. As a consequence of the overcurrent validation, excess current is allowed to flow from the power source during the overcurrent validation period.

SUMMARY

A high side solenoid switch overcurrent protection circuit includes a high side switch transistor operable to connect a voltage source to a solenoid switch. A sense resistor connects the voltage source to a source node of the high side switch transistor. A bias circuit provides a source to gate bias voltage to the high side switch transistor. A secondary bias circuit alters the source to gate bias voltage during an overcurrent validation.

A method for limiting an overcurrent during an overcurrent validation period includes the step of altering a source to gate bias voltage of a high side solenoid switch, thereby limiting a current passing through the high side solenoid switch.

A high side solenoid switch overcurrent protection circuit includes a circuit input operable to receive power from a voltage source. A sense resistor connects the circuit input to a source node of a high side solenoid switch. A voltage divider has voltage divider input connected to the circuit input and an output connected to a comparator. An overcurrent transistor has a source connected to the circuit input, a drain connected to a second voltage divider and an anode of a diode, and a gate connected to an output of the sense resistor, such that a current passing through the sense resistor operates as a control current for the overcurrent transistor. The second voltage divider has an output connected to the comparator, which has an overvoltage validation output. A cathode of the diode connects to a capacitor and a secondary bias resistor such that the capacitor and the secondary bias resistor are parallel. A first bias voltage resistor connects to the output of the sense resistor and to a second bias voltage resistor in series. The second bias voltage resistor connects to a gate node of the high side solenoid switch. Each of the capacitor and the secondary bias resistor connects to a node connecting the first bias voltage resistor and the second bias voltage resistor. A bias current transistor has a collector connected to the node connecting the first bias voltage resistor and the second bias voltage resistor. A bias current resistor connects to an emitter of the bias current transistor and to ground. A drain of the high side solenoid switch connects to an output, such that the drain can be connected to a solenoid.

These and other features of the present invention can be best understood from the following specification and drawings, the following of which is a brief description.

DETAILED DESCRIPTION

Figure 1:
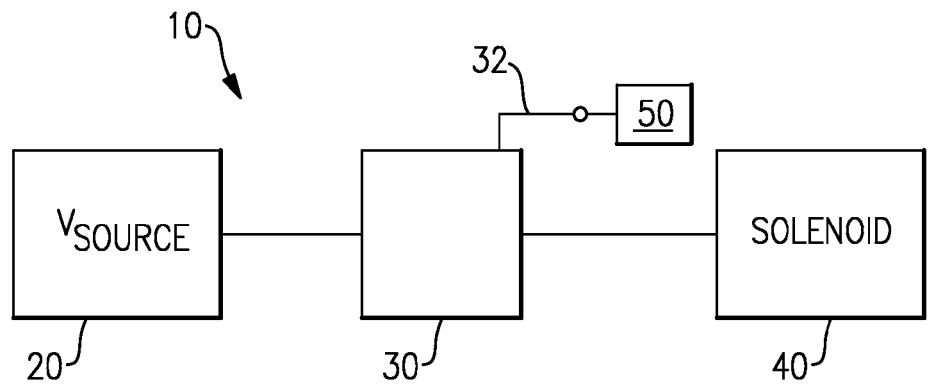
FIG. 1 illustrates a solenoid control configuration with the solenoid being at least partially controlled via hardware controls.

FIG. 1 illustrates an example solenoid control configuration 10 with a voltage source 20 providing power to a solenoid 40. The power flow to the solenoid 40 is controlled at least in part by a hardware control circuit 30. The hardware control circuit 30 includes a fault detection output 32 that can be connected to a software controller such as a general controller 50. The fault detection output 32 is a high (non-0 volt) signal when no overcurrent is present, and a low (0 volt) signal when an overcurrent is present. The fault detection output 32 is monitored by the general controller 50. When the general controller 50 detects an overcurrent that persists for greater than a predefined time period, the general controller 50 determines that a fault is present and disconnects the voltage source 20 from the circuit, thereby preventing excessive current drawn from the voltage source 20.

Figure 2:
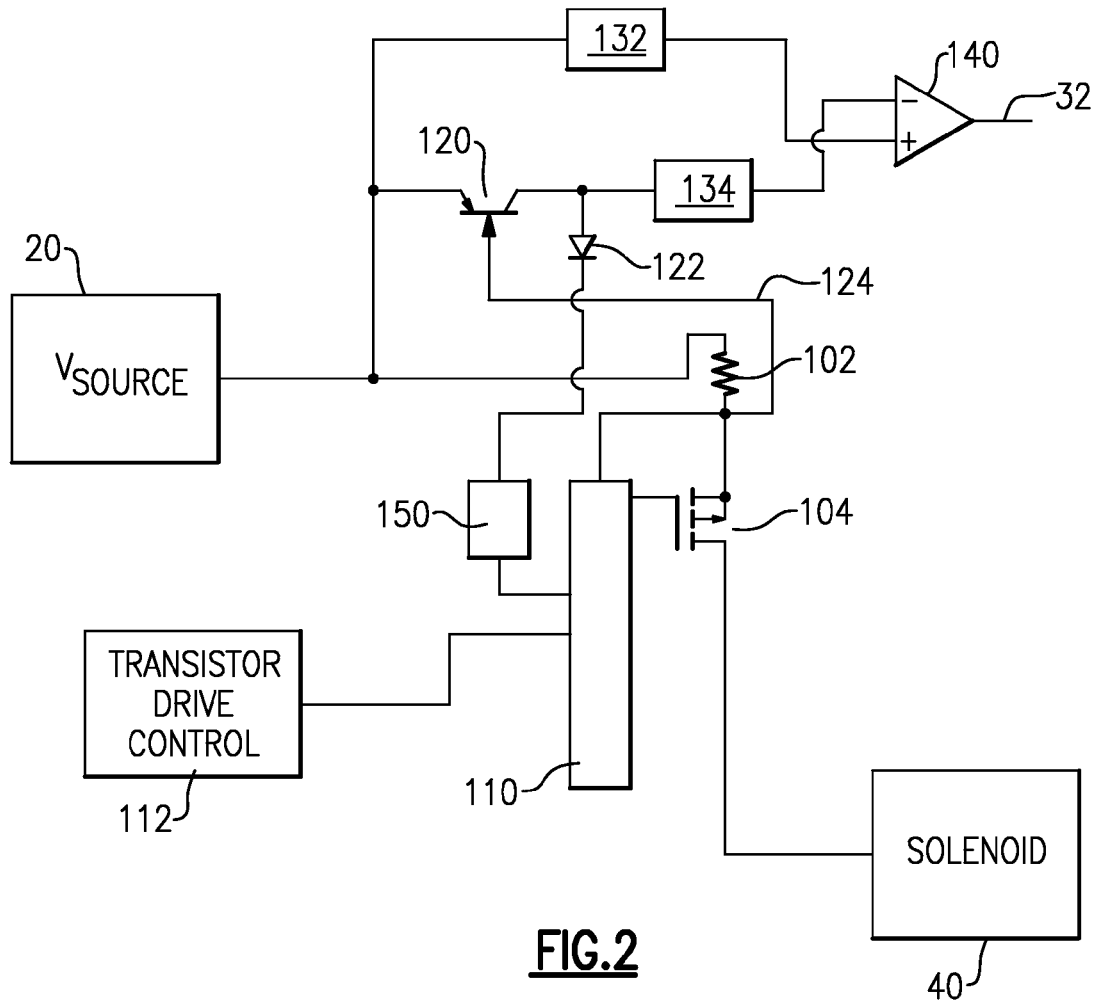
FIG. 2 illustrates a schematic diagram of the hardware controls of the solenoid control configuration of FIG. 1.

FIG. 2 illustrates a schematic diagram of the hardware controls 30 of the solenoid control configuration 10 of FIG. 1, with like numerals indicating like elements. The voltage source 20 is connected to the solenoid 40 via a sense resistor 102 and a high side solenoid switch 104. The high side solenoid switch 104 is a transistor. Current flow through the transistor is determined by the source to gate voltage of the transistor. The source to gate voltage of the transistor is referred to as the bias voltage. The bias voltage of the high side solenoid switch is controlled via a bias circuit 110. The bias circuit 110 is, in turn, controlled by a transistor drive control 112. The transistor drive control 112 can be part of the general controller 50 or an independent transistor controller.

An overcurrent transistor 120 connects the voltage source 20 to a voltage divider 134. The output of the voltage divider 134 provides an input to a comparator 140. A second comparator input is provided from a second voltage divider 132. The second voltage divider 132 receives an input directly from the voltage source 20. Each of the voltage dividers 132, 134 scales the voltage by a known factor prior to passing the voltage to the comparator 140, thereby conditioning the voltage to be utilized by the comparator 140.

When an overcurrent is present, the voltage from the first voltage divider 134 exceeds the voltage from the second voltage divider 132 and the comparator 140 outputs a low (0 volt) signal. In all other cases, the comparator 140 outputs a high (non-0 volt) signal. Thus, the general controller 50 (illustrated in FIG. 1) can monitor for a fault condition. If the overcurrent persists for longer than a predefined period, the general controller 50 determines that a fault is present and disconnects the voltage source 20.

The overcurrent transistor 120 collector is additionally connected to a secondary bias circuit 150 through a diode 122. The diode 122 prevents current backflow through the secondary bias circuit 150 when no overcurrent exists. The control input of the overcurrent transistor 120 is the output of the sense resistor 102, and is configured such that the overcurrent transistor 120 transitions to the on state when current across the sense resistor 102 exceeds a threshold. Thus, the overcurrent transistor 120 remains in the off state unless an overcurrent is present.

When an overcurrent exists, and the overcurrent transistor 120 is on, current flows through the diode 122, through the secondary bias circuit 150, and into the bias circuit 110. The current flow from the secondary bias circuit 150 affects the voltage biasing of the bias circuit 110, thereby altering the source to gate bias voltage of the high side solenoid switch 104. The altered bias voltage of the high side solenoid switch 104 limits the current flowing into the solenoid 40 to a value set at equal to, or slightly over, the overcurrent threshold. Specific bias voltages for limiting a particular high side solenoid switch 104 to a particular current can be determined by a person of skill in the art using known techniques. In this way, an overcurrent is maintained allowing the overcurrent validation to properly function, while at the same time current drawn from the voltage source 20 is limited, thereby preventing damage to the solenoid control hardware 30.

Figure 3:
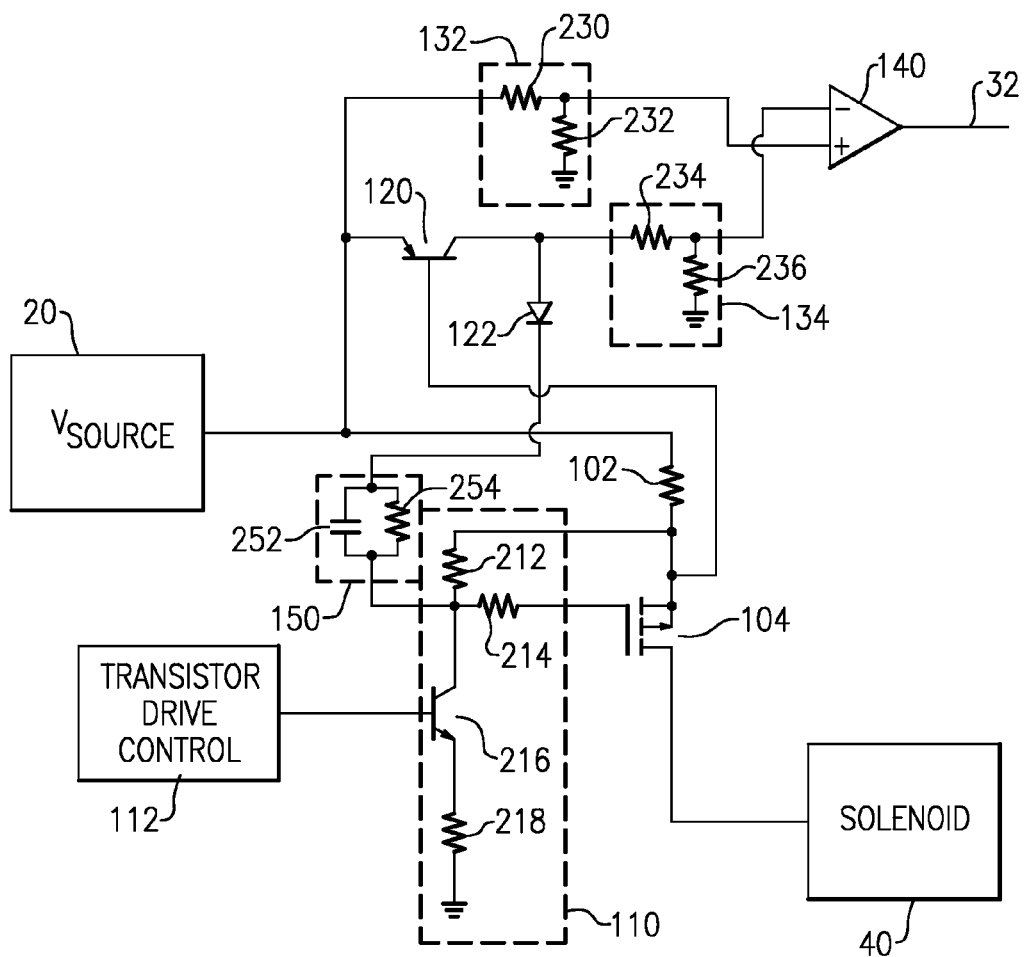
FIG. 3 illustrates a more detailed schematic of the hardware controls illustrated in FIG. 2.

A more detailed schematic drawing of the hardware controls of FIG. 2 is illustrated in FIG. 3 with like numerals indicating like elements. As can be seen in FIG. 3, each of the voltage dividers 132, 134 is a standard voltage divider constructed of two resistors 230, 232, 234, 236 in series, with an output node between the two resistors. The output voltage of the voltage divider 132, 134 is defined by the formula: Vout=Vin(R2/(R1+R2)), with R1 being resistors 230 and 234 in each respective voltage divider 132, 134 and R2 being resistors 232 and 236 in each respective voltage divider 132, 134. Using the above formula, a person of skill in the art can determine appropriate resistor values for each voltage divider 132, 134 resistor 230, 232, 234, 236 to ensure that the output of the first voltage divider 134 exceeds the output of the second voltage divider 132 only during an overcurrent.

The bias circuit 110 includes two bias voltage resistors 212, 214 in series connecting the source and gate of the high side solenoid switch 104, thereby controlling the bias voltage of the high side solenoid switch 104. A transistor 216 connects a bias current resistor 218 at a node between each of the bias voltage resistors 212, 214. The resistance of the bias current resistor 218 controls the total amount of current drawn through the bias circuit 110. When no overcurrent is present, the current drawn through the bias circuit 110 is drawn from the bias voltage resistors 212, 214 which in turn draw the current from the voltage source 20. Current passing through the bias voltage resistors 212, 214 introduces a bias voltage to the high side solenoid switch 104. When the bias voltage is sufficiently high, the high side solenoid switch 104 allows for virtually unfettered current flow, whereas when the bias voltage is low the amount of current that can pass through the high side solenoid switch 104 is limited according to known transistor principles.

When the current across the sense resistor 102 exceeds a threshold, the overcurrent transistor 120 switches to the on state and allows current to pass. The new current flow path opened by the transistor 120 allows current flowing through the bias current resistor 218 to be drawn from the secondary bias circuit 150 in addition to the bias voltage resistors 212, 214. The secondary bias circuit 150 illustrated in the example of FIG. 3, includes a capacitor 252 and a resistor 254 arranged in a parallel configuration.

Since the total current drawn by the bias current resistor 218 is constant, the availability of current through the newly opened current flow path reduces the current draw through the bias voltage resistors 212, 214. The reduced current draw causes a corresponding decrease in the voltage drop across the bias voltage resistors 212, 214 and a corresponding reduction in the bias voltage of the high side solenoid switch 104. The decreased bias voltage is sufficiently low to limit the amount of current that can pass through the high side solenoid switch 104, thus providing a current limit during the overcurrent validation period.

Although an example embodiment has been disclosed, a worker of ordinary skill in this art would recognize that certain modifications would come within the scope of this disclosure. For that reason, the following claims should be studied to determine the true scope and content of this disclosure.

What is claimed is:

1. A high side solenoid switch overcurrent protection circuit comprising:
   a high side solenoid switch operable to connect a voltage source to a solenoid switch;
   a sense resistor connecting said voltage source to a source node of said high side solenoid switch;
   a bias circuit operable to provide a source to gate bias voltage to said high side solenoid switch; and
   a secondary bias circuit operable to alter said source to gate bias voltage during an overcurrent validation; and
   a comparator having first and second inputs, said first input connected to a first voltage divider and said second input connected to a second voltage divider;
   said first voltage divider connected to an overcurrent transistor and operable to provide an overcurrent threshold current to said comparator; and
   said second voltage divider directly connected to said voltage source.

2. The high side solenoid switch overcurrent protection circuit of claim 1, further comprising an overcurrent transistor operable activate said secondary bias circuit when an overcurrent is detected.

3. The high side solenoid switch overcurrent protection circuit of claim 2, wherein a base bias current of said overcurrent transistor is a current through said sense resistor.

4. The high side solenoid switch overcurrent protection circuit of claim 1, wherein said secondary bias circuit comprises at least a capacitor and a resistor in parallel.

5. The high side solenoid switch overcurrent protection circuit of claim 4, wherein said secondary bias circuit further comprises a diode operable to prevent current backflow through said secondary bias circuit during normal operating conditions.

6. The high side solenoid switch overcurrent protection circuit of claim 1, wherein said secondary bias circuit is operable to alter a current through said bias circuit and alter a source to gate bias voltage of said high side switch transistor.

7. The high side solenoid switch overcurrent protection circuit of claim 1, wherein said high side solenoid switch is a transistor switch.

8. The high side solenoid switch overcurrent protection circuit of claim 1, wherein the secondary bias circuit is operable to alter said source to gate bias voltage to an on bias voltage during an overcurrent validation.

9. A method for limiting an overcurrent during an overcurrent validation period comprising the step of:
   altering a source to gate bias voltage of a high side solenoid switch, thereby limiting a current passing through said high side solenoid switch by altering a current path via activating a secondary bias circuit; and
   preventing current back-flow through said secondary bias circuit when no overcurrent is present.

10. The method of claim 9, wherein activating said secondary bias circuit comprises activating an overcurrent transistor when an overcurrent exists and allowing current to flow through said secondary bias circuit.

11. The method of claim 9, wherein said current passing through said high side solenoid switch is limited to be equal to an overcurrent threshold, thereby maintaining an overcurrent for overcurrent validation while simultaneously limiting the current.

12. The method of claim 9, further comprising the step of determining if an overcurrent is present by comparing a voltage source output with an overcurrent transistor output using a comparator.

13. The method of claim 12, further comprising the step of disconnecting said voltage source when an overcurrent exists for longer than an overcurrent validation period.

14. A high side solenoid switch overcurrent protection circuit comprising:
   a circuit input operable to receive power from a voltage source;
   a sense resistor connecting said circuit input to a source node of a high side solenoid switch;
   a voltage divider having a voltage divider input connected to said circuit input and an output connected to a comparator;
   an overcurrent transistor having an emitter connected to said circuit input, a collector connected to a second voltage divider and an anode of a diode, and a base connected to an output of said sense resistor, such that a current passing through said sense resistor operates as a control current for said overcurrent transistor;
   said second voltage divider having an output connected to said comparator;
   said comparator having an output, and the output is a fault detection output;
   a cathode of said diode connected to a capacitor and a secondary bias resistor such that said capacitor and said secondary bias resistor are parallel;
   a first bias voltage resistor connected to said output of said sense resistor and to a second bias voltage resistor in series;
   said second bias voltage resistor connected to a gate node of said high side solenoid switch;
   each of said capacitor and said secondary bias resistor connected to a node connecting said first bias voltage resistor and said second bias voltage resistor;
   a bias current transistor having a collector connected to said node connecting said first bias voltage resistor and said second bias voltage resistor;
   a bias current resistor connected to an emitter of said bias current transistor and to ground; and
   a drain of said high side solenoid switch connected to an output, such that said drain of said high side solenoid switch can be connected to a solenoid.

* * * * *